F. MEAD.
INNER CUSHIONED WHEEL.
APPLICATION FILED OCT. 10, 1918.
1,401,421.
Patented Dec. 27, 1921.
2 SHEETS—SHEET 1.
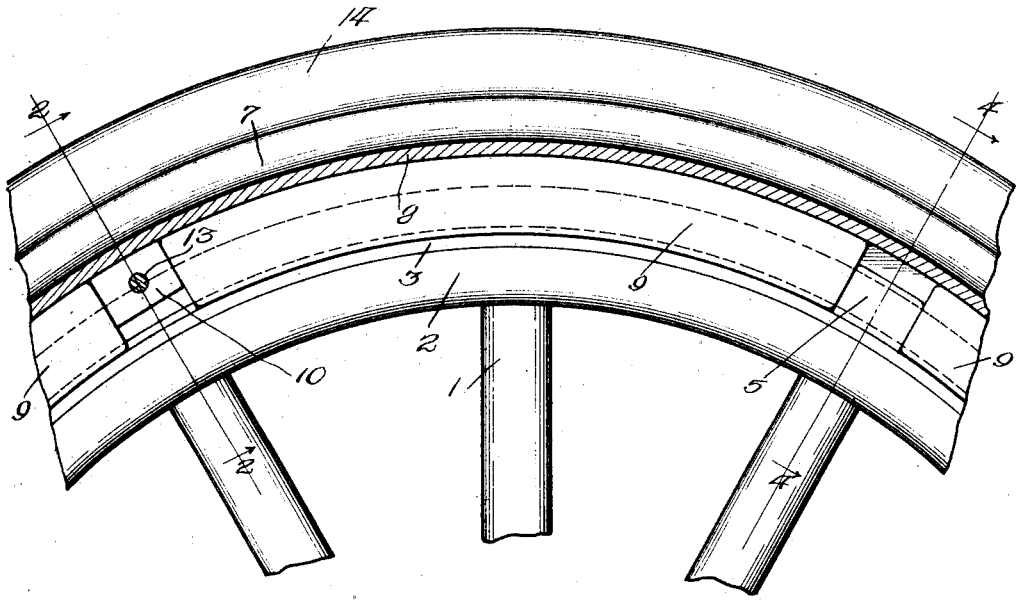
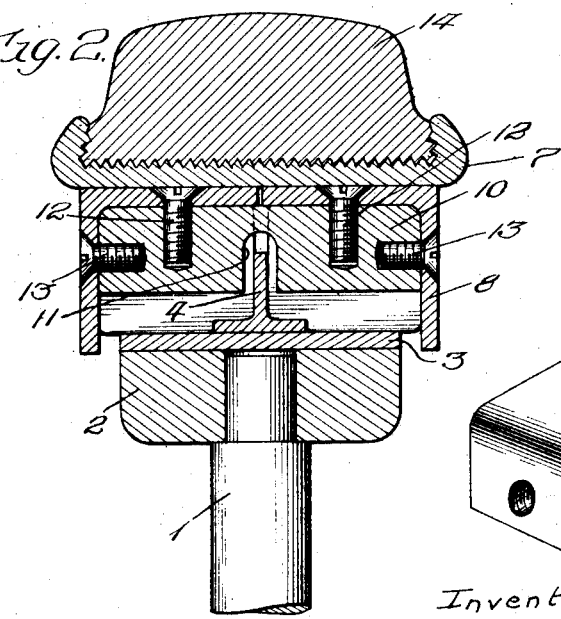
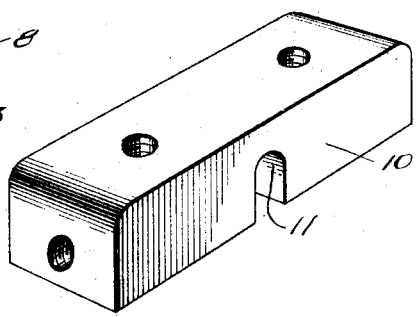
Inventor:
Francis Mead

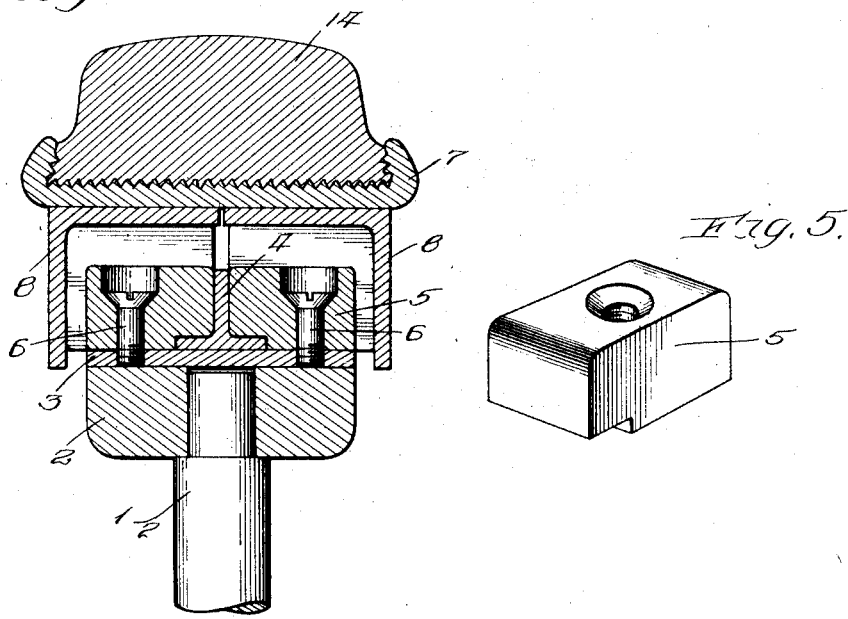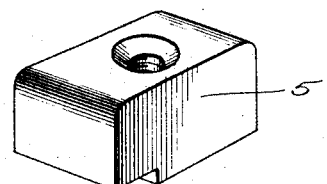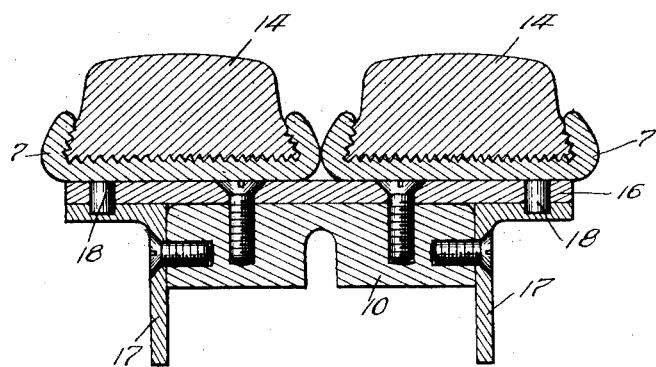

UNITED STATES PATENT OFFICE.

FRANCIS MEAD, OF CHICAGO, ILLINOIS.

INNER-CUSHIONED WHEEL.

1,401,421.   Specification of Letters Patent.   Patented Dec. 27, 1921.

Application filed October 10, 1918. Serial No. 257,672.

*To all whom it may concern:*

Be it known that I, FRANCIS MEAD, citizen of the United States, residing at Chicago, in the county of Cook and State of Illinois, have invented certain new and useful Improvements in an Inner-Cushioned Wheel; and I do hereby declare the following to be a full, clear, and exact description of the invention, such as will enable others skilled in the art to which it appertains to make and use the same.

My invention relates to inner-cushioned wheels, that is to say, to the type of wheels in which the resiliency is provided, at least in part, by cushioning elements disposed between the felly of the wheel and an outer rim. In U. S. Patent No. 1195379, issued to me on August 22, 1916, I have shown a wheel of this class in which the cushioning elements consist of soft rubber blocks arranged in two annular formations, with the lateral edges of the blocks respectively engaging a web carried by the inner felly and side flanges carried by the outer rim, and in which the ends of the cushioning blocks engage thrust partitions or so called "driving dogs" alternately secured to the inner and outer wheel parts. In its general aspects, my present invention relates to means for simplifying, strengthening and cheapening the construction of wheels of this type, to means for expediting a proper assembling of the wheel parts, and means for utilizing the driving dogs also for holding certain of the wheel parts in operative positions.

More particularly, my invention aims to equip the inner wheel portion with driving dogs arranged for holding the central web member upon this portion of the wheel; to use a single pair of angle-sectioned steel rings for both the cylindrical cushioned-engaging portions of the outer rim and the side flanges carried by the latter; to provide simple means for securing such angle-sectioned rings to each other in proper operative relation, and preferably to utilize some of the driving dogs for this latter purpose. Furthermore, my invention aims to provide outer rim elements equipped with side flanges and rigidly secured to each other in operative relation independently of any tire band, and to provide simple means for preventing an excessive lateral movement of such wheel elements toward each other; also, to simplify the proper alining of various wheel parts with each other and the assembling of the same in operative relation. Moreover, by invention aims to construct a wheel of the class described in which the central web may be secured to a standard non-cushioned wheel with a relatively small amount of simple machine work, and in which the other wheel portions may easily be inserted between a standard tire rim and a wheel thus equipped with a peripheral web. Still other objects will appear from the following specification and from the accompanying drawings, in which—

Figure 1 is a fragmentary elevation of a wheel embodying my invention, showing the position of the driving dogs with respect to the cushion sections.

Fig. 2 is a transverse section through the wheel of Fig. 1 along the line 2—2.

Fig. 3 is an enlarged perspective view of one of the driving dogs used in connection with the outer rim portions of the wheel of Figs. 1 and 2.

Fig. 4 is a radial and transverse section through the wheel of Fig. 1 along the line 4—4.

Fig. 5 is an enlarged perspective view of one of the driving dog elements shown in Fig. 4.

Fig. 6 is a fragmentary transverse section of an outer rim portion of the wheel embodying my invention and having twin tires.

In applying my invention to a wheel having a single tire, I may start with a standard type of wheel center including spokes 1 carrying a wood felly 2 surrounded by a standard "SAE band" 3 as in Figs. 2 and 4. I then provide a steel ring made of an inverted T section, with the head of the T directed inwardly, this ring having a bore closely fitting the outer diameter of the band 3. By slipping this ring 4 into a position central of the band 3, as shown in the drawings, I obtain a peripheral web suitably disposed for engaging the lateral faces of the two sets of cushioning elements. This ring 4 may be suitably secured direct to the band 3, but I have found it ample to hold the said ring in position by driving dog elements 5 as shown in Figs. 4 and 5. Each of these driving dogs desirably consists of a metal block of such a width that when one edge engages the side of the web of the ring 4, the opposite edge will come flush with the lateral face of the felly 2. The underside of each of the dogs 5 is preferably recessed or undercut as shown in the drawings, so as to lap over one flange of the base of the ring 4. Then each of the said dogs is secured to the band 3 by any convenient means, such as a screw 6. By suitably proportioning the size and shape of such a driving dog, a single screw is ample in connection with the same both for holding the dog itself firmly in position and for anchoring the adjacent portion of the ring 4 to the band 3. Consequently, when these dogs 5 are all in position, the web-carrying ring 4 will be rigidly held in proper operative relation to the wheel without the necessity of any machine work on this ring, or of securing the ring direct to the band 3.

On the companion or outer portion of the wheel, I likewise use certain elements both as driving dogs and for operatively securing certain elements in proper relation to each other. For a wood wheel having a single tire, I desirably employ an outer tire-carrying rim 7 one size greater in width and two sizes larger in diameter than the SAE band 3 on the center portion of the wheel. Then I mount within this tire rim 7 a pair of angle-sectioned steel rings 8 which rings afford both the surfaces bearing against the periphery of the cushioning elements 9 and the side flanges engaging the exposed lateral faces of these cushion elements. To hold these rings 8 in proper relation to each other (that is to say, with the cylindrical portions in proper alinement and with the side flange portions properly spaced from each other) I connect them by the same driving dogs 10 which space alternate pairs of consecutive cushioning elements from each other. These driving dogs 10 are desirably made of metal and desirably are equipped at their centers with channel formations 11 adapted to straddle the web of the T-band 4, as shown in Fig. 2. Each of these driving dogs 10 is connected to the cylindrical portions of both of the angular rings 8 by any suitable means, such as the screws 12, and may also be connected to the side flange portions of the same rings by auxiliary screws 13. When thus secured in position, it will be obvious from Fig. 2 that each of these driving dogs 10 rigidly connects the two angle-sectioned rings so as to prevent any relative movement of the latter, and by using dogs 10 of a suitable length, I insure the proper spacing of the side flanges without requiring exactness in the width of the cylindrical portions of these rings, or even requiring these cylindrical portions to abut against each other.

In assembling the wheel as just described, the T-band 4 is slipped on the SAE band 3, after which the pairs of driving dogs 5 are secured to the latter band, thereby also fixing the T-band in position. Then the outer driving dogs are slipped into position and one annular set of the rubber cushions is disposed upon the exterior of the band 3, after which one of the angle-sectioned rings is slipped over this set of cushions and is fastened by the screws to the outer driving dogs. I next slip the other set of cushions into position, and slide the companion angle-sectioned ring 8 over these cushions. When doing so, the width of the cushions will tend to hold the side flange of the ring 8 away from the driving dog, but by turning the screw 13 I can compress the cushions laterally and draw the side flange tightly against the ends of the driving dog. Then I can insert the screws 12 after the screws 13 have been drawn up tightly against the ends of the driving dog. Then I can insert the screws 12 after the screws 13 have been drawn up tightly, and can even do the drilling and tapping for these screws 12 after the rings 8 have thus been connected by means of the driving dogs and the screws 13. Last of all, I slip the tire ring 7 upon the outer or cylindrical surface of the rings 8, this tire ring desirably having a tread tire 14 molded directly on it.

However, while I have pictured and described my invention as illustrating a certain embodiment, and have described a certain procedure in assembling the same, I do not wish to be limited to the above described details of construction, assembling, or arrangement, it being obvious that the same might be modified in many ways without departing from the spirit of my invention. For example, the side flanges need not be integral with the cylindrical portions engaging the radially outward surfaces of the cushions. Thus, Fig. 6 shows an outer rim construction in which a pair of tire-carrying rims 7 are shrunk upon a single band 16, which band laterally overlaps angle-sectioned rings 17 facing outwardly of the wheel. In this case, the outer driving dog 10 is secured both to the band 16 and the angle-sectioned rings 17, thereby uniting these into a rigid structure. The band 16 in this construction may also be connected to the cylindrical portions of the ring 17 by pins 18 extending entirely through the band 16 and only partly through the said cylindrical portion of the ring 17, these pins being desirably of larger size than the bores into which they are forcibly driven.

I claim as my invention:

1. In a vehicle wheel, relatively spaced inner and outer rims, a medially disposed web associated with one of the rims and extending into the space between the rims, cushions between the rims, disposed in two annular formations at opposite sides of the web and extending laterally beyond the sides of the rim with which the web is associated, side flanges carried by the other rim, and driving dogs disposed between the circumferentially consecutive cushions and secured alternately to the two rims, the driving dogs secured to the said other rim being disposed for rigidly spacing the side flanges from each other and for securing the side flanges to the said other rim.

2. In a vehicle wheel, relatively spaced inner and outer rims, a medially disposed web associated with one of the rims and extending into the space between the rims, cushions disposed in two annular formations at opposite sides of the web and extending laterally beyond the sides of the rim with which the web is associated, side flanges carried by the other rim, and driving dogs disposed between the circumferentially consecutive cushions and secured alternately to the two rims, the medially disposed web being held in operative position upon the rim with which it is associated by the alternate driving dogs.

3. In an inner cushioned wheel of the class described, an inner rim member, a T-band disposed thereon, and driving dogs secured to the inner rim member and overhanging base portions of the T-band to clamp the latter to the said rim member.

4. In an inner cushioned wheel, an inner rim member, a T-band disposed thereon, cushioning elements disposed in annular formation about the inner rim member at opposite sides of the T-band, and driving dogs each disposed between consecutive cushioning elements and each secured to the inner rim member and each anchoring an adjacent portion of the T-band to said member.

5. In an inner cushioned wheel, an inner rim member, an annular member surrounding a medial portion of the rim member and including a web extending outwardly of the said member, and driving dogs each secured to said member and arranged for holding the annular member in its said position.

6. In a vehicle wheel, inner and outer rims, two sets of driving dogs alternating with each other and secured respectively to the inner and outer rims and extending partly across the space therebetween, cushions disposed in said space and respectively abutting at their ends against consecutive driving dogs and projecting laterally beyond one of the said rims, and side flanges carried by one of the rims and out of contact with the other rim, said side flanges respectively engaging the projecting portions of the cushions and said side flanges being secured to and rigidly spaced from each other by one set of driving dogs.

7. In a cushioned wheel having a series of cushions successively disposed in annular formation between an inner rim and a medially split channel-sectioned outer rim, driving dogs each disposed between successive cushions and each fastening the two angle-sectioned parts of the split outer rim to each other.

8. In an inner-cushioned wheel of the class described, cushioning elements disposed in annular formation, a plurality of driving dogs operatively interposed between the consecutive cushioning elements, and metal members including a pair of rims between which the cushioning elements are disposed and a pair of side flanges associated with one of the rims, each of the driving dogs being secured to at least one of the said metal members.

Signed at Chicago, Illinois, June 22nd, 1918.

FRANCIS MEAD.